INVENTORS
ROBERT B. LIGHTNER
BENTON A. WHITEMAN

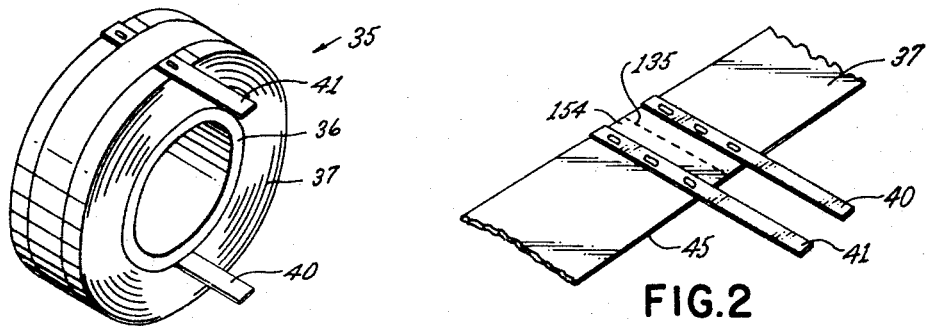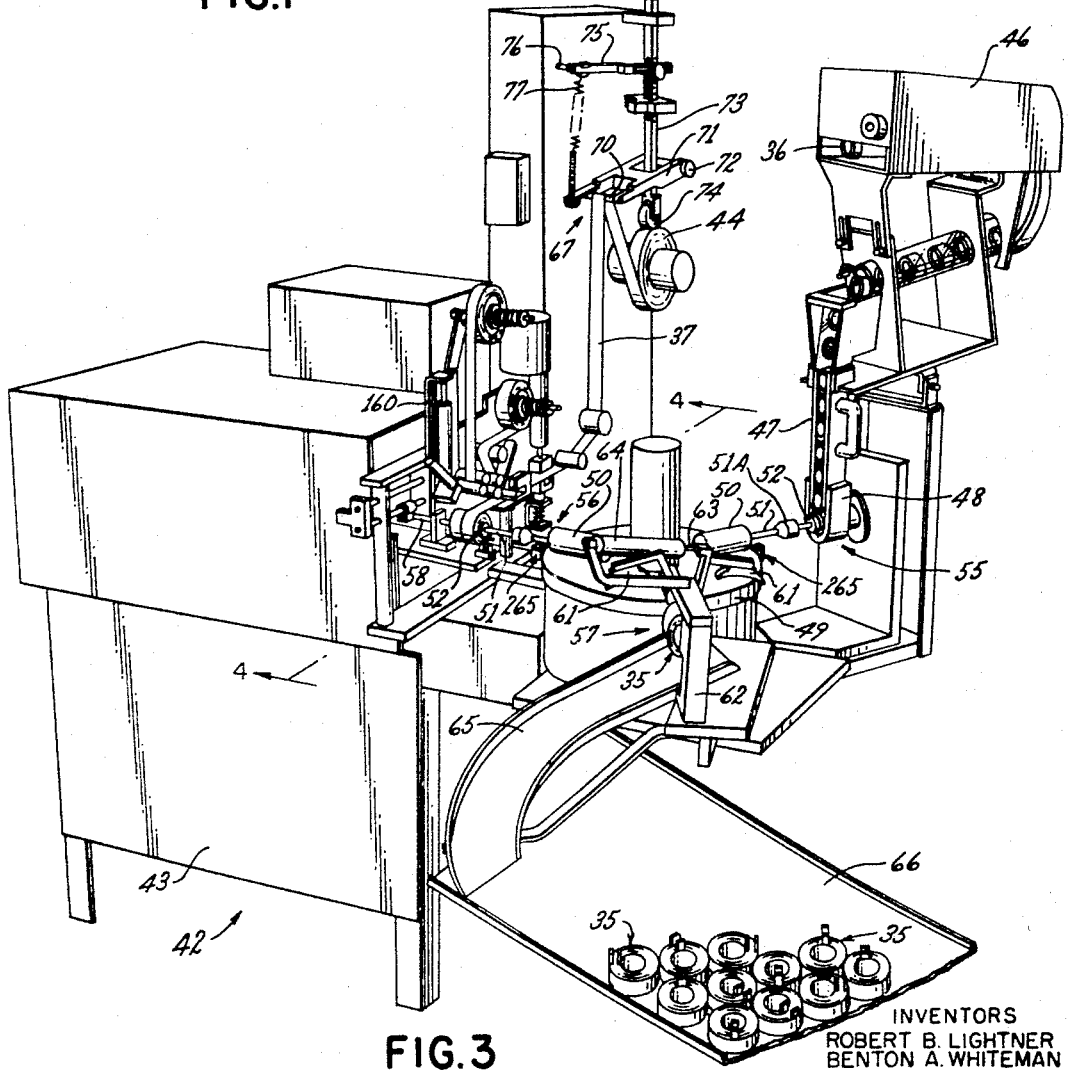

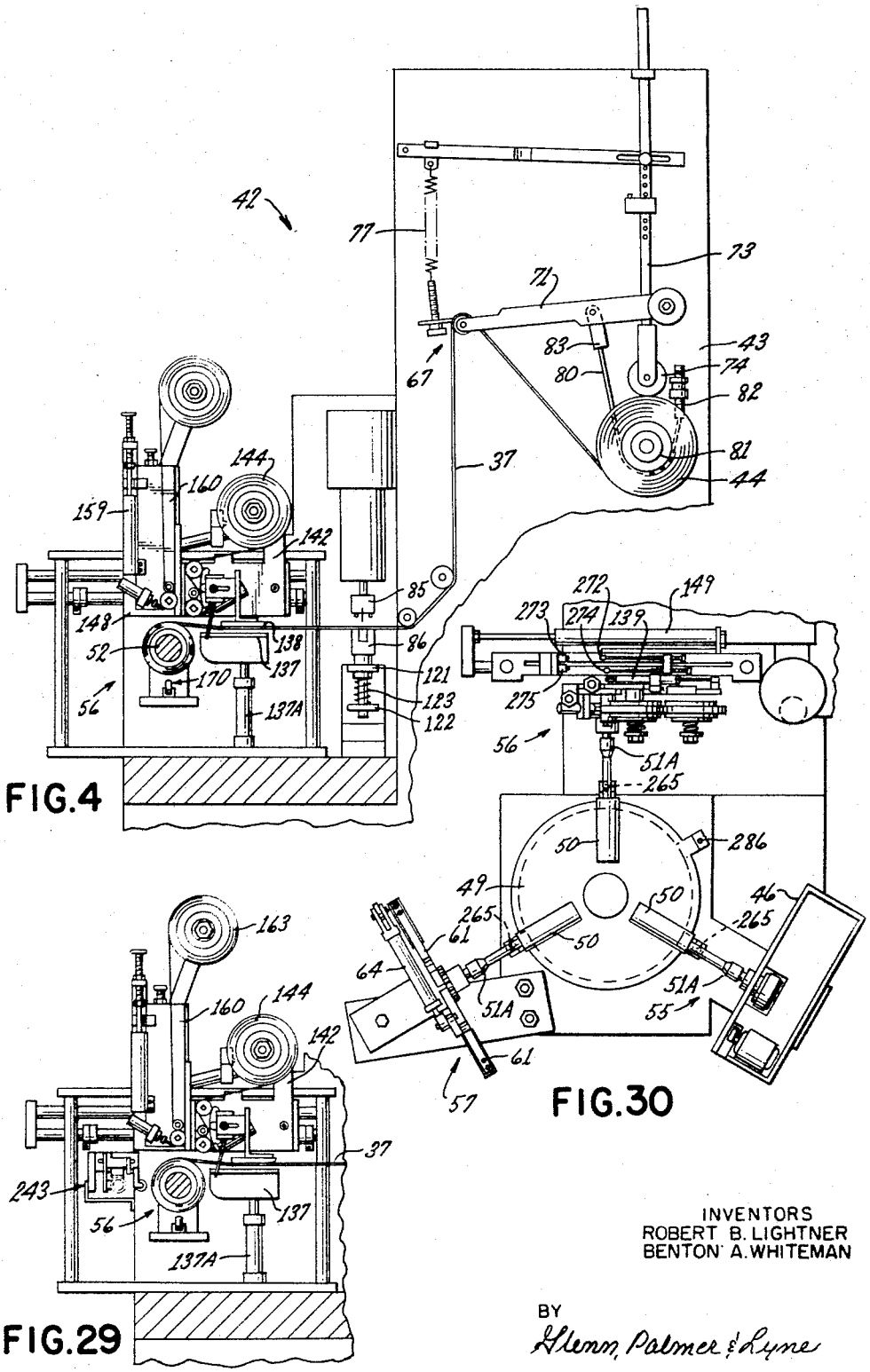

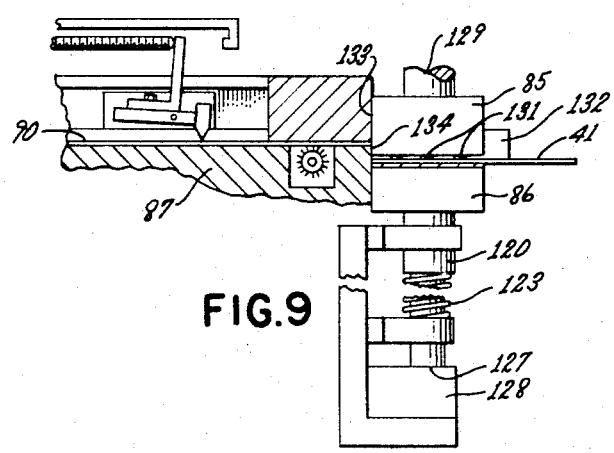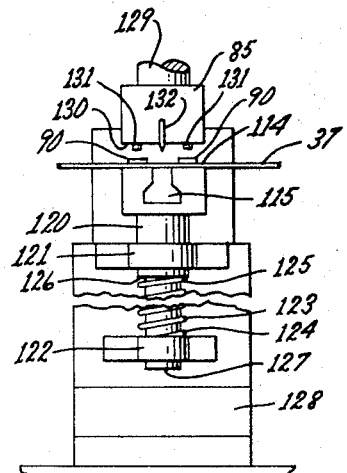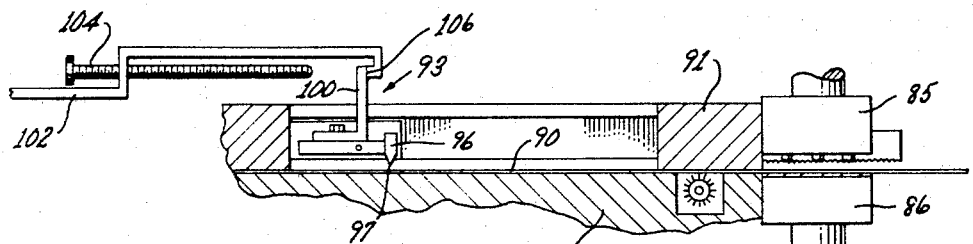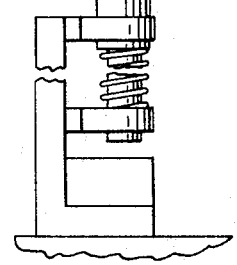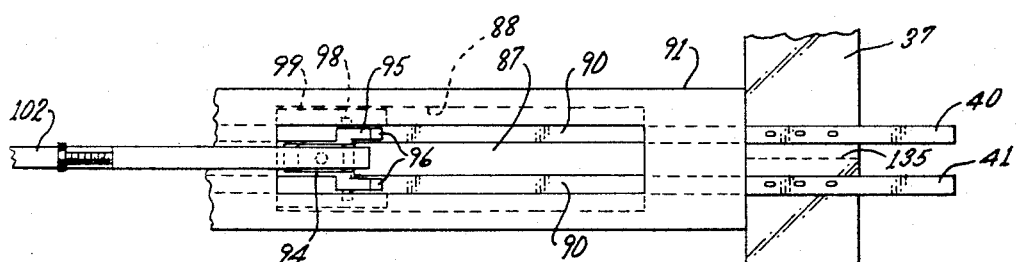

BY
*Glenn, Palmer & Lyne*

THEIR ATTORNEYS

INVENTORS
ROBERT B. LIGHTNER
BENTON A. WHITEMAN

THEIR ATTORNEYS

INVENTORS
ROBERT B. LIGHTNER
BENTON A. WHITEMAN

BY
Glenn, Palmer & Lyne
THEIR ATTORNEYS

INVENTORS
ROBERT B. LIGHTNER
BENTON A. WHITEMAN

BY
Glenn, Palmer & Lyne

THEIR ATTORNEYS

United States Patent Office 3,438,124
Patented Apr. 15, 1969

3,438,124
APPARATUS FOR AND METHOD OF WINDING MATERIAL MEANS TO FORM COIL MEANS
Robert B. Lightner, Henrico County, and Benton A. Whiteman, Richmond, Va., assignors to Reynolds Metals Company, Richmond, Va., a corporation of Delaware
Filed June 8, 1967, Ser. No. 644,511
Int. Cl. H01f 41/08; B21c 47/04
U.S. Cl. 29—605                               40 Claims

ABSTRACT OF THE DISCLOSURE

This disclosure relates to an apparatus for and method of making coil means from an elongated strip of material means such as a strip of electrically conductive material, for example. Each exemplary electrical coil means of this disclosure has an inner electrical lead which is effectively used as a reference to enable an associated outer electrical lead to be attached thereto in a precise position relative to such inner electrical lead.

---

This invention relates to an improved apparatus for and method of winding coil means and more particularly to an improved apparatus for and method of winding electrical strip conductor coils having inner and outer electrical leads fastened thereto.

It has been proposed in co-pending patent application, Ser. No. 366,497, filed May 11, 1964, to provide electrical coils each made of an elongated strip of electrically conductive material wherein the inner and outer ends of such coiled strip have inner and outer electrical leads respectively attached thereto so that suitable electrical connections can be made to the opposite ends of such coiled strip. Furthermore, it has been proposed in co-pending patent application, Ser. No. 497,069, filed Oct. 18, 1965, to compensate for thickness variations in the strip of conductive material defining a given coil in an effort to more accurately control the relative positions of such inner and outer electrical leads.

However, it has been found that the previously proposed devices and techniques, including the proposals presented in the above mentioned co-pending patent applications, have not satisfactorily solved the problem of precisely relatively positioning inner and outer electrical leads of an electrical strip conductor coil, or the like, to enable efficient installation of such strip conductor coil in an associated housing means, for example.

Accordingly, it is a feature of this invention to provide an improved apparatus for making coil means, such as an electrical strip conductor coil, for example, wherein inner and outer electrical leads of such electrical coil are precisely positioned relative to each other.

Another feature of this invention is to provide an improved apparatus for making electrical conductor coils, or the like, which has means utilizing the inner electrical lead comprising each coil formed on such apparatus as a reference to enable precise positioning and fastening of an associated outer electrical lead on such coil.

Another feature of this invention is to provide an improved method of making coil means.

Another feature of this invention is to provide an improved method of making an electrical coil from an elongated strip or ribbon of electrically conductive material wherein such coil has inner and outer electrical leads which are precisely attached to such coil during the forming thereof.

Therefore, it is an object of this invention to provide an improved apparatus for and method of making coil means such as strip conductor coils, or the like, having one or more of the novel features of this invention as set forth above or hereinafter shown or described.

Other objects, uses, and advantages of this invention are apparent from a reading of this description which proceeds with reference to the accompanying drawings forming a part thereof and wherein:

FIGURE 1 is a perspective view of an exemplary strip conductor coil formed according to the teachings of this invention.

FIGURE 2 is a fragmentary perspective view illustrating a pair of leads attached in side by side relation to a strip of conductive material as taught by this invention.

FIGURE 3 is a perspective view illustrating one exemplary embodiment of the apparatus and method of this invention.

FIGURE 4 is a fragmentary sectional view taken on the line 4—4 of FIGURE 3.

FIGURES 6–10 are views similar to FIGURE 5 illustrating the apparatus in various operating positions.

FIGURE 11 is a fragmentary end view of the structure illustrated in FIGURE 5.

FIGURE 12 is a fragmentary top view of the structure illustrated in FIGURE 5.

FIGURE 29 is a fragmentary view similar to FIGURE 6 and showing the position of the compensating means of FIGURE 26 on the apparatus of FIGURE 3.

FIGURE 30 is a fragmentary top view of the apparatus illustrated in FIGURE 3.

Figure 5:
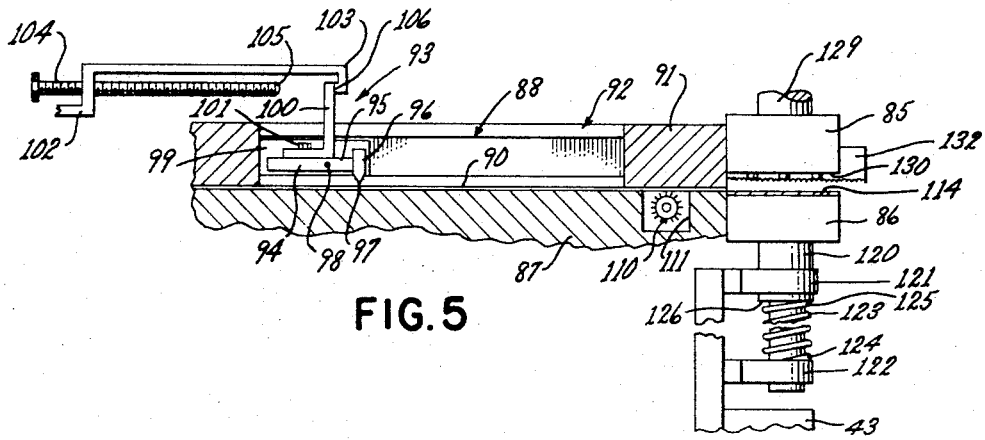
FIGURE 5 is a fragmentary cross-sectional view illustrating the apparatus and method for attaching the leads of FIGURE 2 to its associated strip of conductive material.

While the various features of this invention are hereinafter described and illustrated as being particularly adaptable for providing an improved strip conductor coil construction, or the like, it is to be understood that the various features of this invention can be utilized singly or in any combination thereof to provide other devices, as desired.

Therefore, this invention is not to be limited to only the embodiments illustrated in the drawings, because the drawings are merely utilized to illustrate one of the wide variety of uses of this invention.

The strip conductor coil construction of this invention is shown in FIGURE 1 and indicated generally by the reference numeral 35. Coil 35 comprises a tubular and substantially right circular cylindrical core element 36 which has a ribbon or strip 37 of electrically conductive material wound thereon in a manner as will be hereinafter described. Strip 37 has inner end means comprising an inner electrical lead 40 fixed thereto and outer end means comprising an outer electrical lead 41 suitably fixed thereto. The completed coil 35 is adapted to be installed in an associated electrical system with its leads 40 and 41 suitably electrically connected in a known manner. In many applications it is important that leads 40 and 41 be precisely relatively positioned and firmly secured on strip 37 defining coil 35 and the apparatus and method of this invention assure that leads 40 and 41 are positioned and secured as desired.

In this exemplary embodiment of the invention, the under side of the strip of conductive material 37 is preferably prelaminated to an insulative strip or coating of insulating material before the same is wound on the core element 36 to provide electrical insulation means between adjacent coils of the strip of conductive material 37. However, if desired, strip 37 can be wound on core element 36 in unison with a separate strip of insulating material so that the strip of insulating material is interleaved between adjacent coils of the strip of conductive material 37 to electrically insulate adjacent coils of strip 37 from each other.

The method and apparatus of this invention for forming strip conductor coil construction 35 of FIGURE 1 in a substantially continous manner is generally indicated by the reference numeral 42 in FIGURE 3. Apparatus 42 includes a frame structure 43 rotatably carrying a supply roll 44 of conductive strip material 37. As previously stated, the material 37 of this exemplary embodiment of the invention preferably has a strip or coating 45 of insulating material laminated to its lower surface, as illustrated in FIGURE 2, to provide electrical insulation between adjoining coils.

The tubular core elements 36 may be made of cardboard or the like and are contained in a suitable hopper means or hopper 46. Hopper 46 has a downwardly extending chute 47 extending from its lower end. Each core element is adapted to be serially fed into a retainer 48 provided at the terminal lower end of chute 47 and supported to enable it to be easily picked up by an associated mandrel in a manner to be subsequently described.

As illustrated in FIGURE 3, frame structure 43 carries a rotary table 49 which is adapted to be indexed in a rotary manner about a fixed vertical axis. Table 49 carries three actuators shown as three fluid cylinders each designated by the numeral 50.

Each cylinder 50 has a telescoping rod 51 which carries a radially expandable and freely rotatable mandrel 52 at its terminal end.

The table 49 is adapted to index the mandrels 52 through three stations 55, 56, and 57. When a mandrel 52 is indexed to station 55, the associated cylinder 50 extends associated rod 51 radially outwardly telescoping mandrel 52 within a core element 36 supported within retainer 48 at the lower end of hopper 46.

When the mandrel 52 at station 55 has a core 36 thereon, the associated piston rod 51 is retracted by cylinder 50 so that the core 36 is carried by mandrel 52 out of the retainer 48 whereby such retracted mandrel can be indexed from station 55 to station 56. Hopper 46 contains a plurality of cores 36 which are adapted to be serially dropped into retainer 48 through chute 47 as previously mentioned. As each core 36 is removed by an associated mandrel from retainer 48 another core 36 drops in its place.

With the core carrying mandrel 52 now at station 56, the piston rod 51 thereof is extended to interconnect mandrel 52 by suitable clutch means to suitable drive shaft means shown as a rotatable drive shaft 58 comprising winding apparatus 42. As drive shaft 58 is rotated, the same rotates mandrel 52 at station 56 to cause elongated strip 37 to be wound on the core 36 carried by the rotating mandrel 52 in a manner as will be hereinafter described.

After a completed strip conductor coil 35 has been formed on mandrel 52 at station 56, the associated piston rod 51 is retracted to disconnect the driven mandrel 52 from drive shaft 58 whereby the retracted mandrel 52 is then indexed from station 56 to station 57. With the completed strip conductor coil 35 on mandrel 52 at station 57, the associated piston rod 51 is extended whereby the strip conductor coil 35 is held in a position at the station 57 so that a pair of stripping members each designated by the numeral 61 can strip the finished strip conductor coil from mandrel 52.

The stripping members, see FIGURE 3, are pivotally mounted to a support 62 by suitable pivot pins respectively carrying pinion gears disposed in meshing relation with each other. One of the stripping members 61 is interconnected to a piston rod 63 adapted to be extended and retracted by a fluid cylinder 64 carried by support 62. Thus, with a completed strip conductor coil 35 being held at station 57 on an extended mandrel 52, cylinder 64 is actuated to telescope its rod 63 outwardly whereby through the action of the above mentioned pinion gears stripping members 61 are brought into clamping engagement in a known manner on opposite sides of coil 35.

With the strip conductor coil 35 now firmly clamped between the stripping members 61 retraction of the piston rod 51 of the mandrel 52 at station 57 pulls such mandrel out of the core 36 of the completed strip conductor coil 35 so that the particular mandrel 52 can be subsequently indexed to the station 55 by indexing table 49. With the mandrel 52 at station 57 now retracted from within core 36 of the completed strip conductor coil 35, the cylinder 64 can be deactuated to return the stripping members 61 to the open position illustrated in FIGURE 3 whereby such members drop the completed strip conductor coil 35 onto a chute means 65. The completed strip conductor coil 35 moves down chute 65 to a table 66 for subsequent testing, packaging, and the like of the completed strip conductor coils 35 produced by apparatus 42.

As illustrated in FIGURE 3, the elongated strip 37 is adapted to be fed from supply roll 44 through suitable slack reducing and tension applying roller device designated generally by the numeral 67. Thus, strip 37 passes from its free wheeling supply roll 44 around a roller 70 carried by a frame means 71 pivotally mounted to the frame 43 of apparatus 42 by a pivot means 72. A rod 73 is slidably carried by frame means 71 and has a roller 74 rotatably supported at its lower end and resting on supply roll 44.

An arm 75 is provided and has one end pivotally mounted to the frame 43 by pivot means 76 and its opposite end adjustably carried by rod 73 which is interconnected to member 71 by an adjustable tension spring 77.

As seen in FIGURE 4 a suitable braking system is provided for supply roll 44 and comprises a brake band 80 passed around a roller 81 which carries the supply roll 44. Band 80 has one end 82 fixed to the frame structure 43 while the other end 83 is fastened to the arm 71. It is to be understood that the purpose of the braking system for the supply roll 44 is to cooperate with device 67 to provide a uniform tension means on the strip 37 as it is fed through the apparatus 42; act as a shock absorbing means, particularly when the apparatus 42 is started; and to overcome the inertia of the rotating supply roll 44 when apparatus 42 is stopped.

As supply roll 44 is continuously used, less and less spring tension by spring 77 is needed whereby the interaction of the linkages comprising device 67 together with spring 77 automatically provides the desired tension. For example, as the supply roll 44 decreases in diameter, the roller 74 carries member 73 downwardly, and, thus, carries the right end of arm 71 downwardly to lessen the tension of spring 77 the correct amount.

The detailed description will now proceed with a presentation of the manner in which electrical leads 40 and 41 are fastened in position at opposite ends of the elongated strip 37 comprising coil 35. The detailed description will first be made of the structure comprising apparatus 42 which is used to simultaneously fix the outer lead 41 of one coil 35 being completed on apparatus 42 immediately adjacent an inner lead 40 for the next coil 35 to be formed on apparatus 42. Detailed presentation will then be made of the taping means used to tape the inner end means of strip 37 on an associated core 36 and then tape the outer end means of a strip 37 comprising coil 35 in position to prevent coil 35 from unwinding. Finally, a detailed presentation will be made of the unique apparatus and method of this invention which enables outer lead 41 to be precisely fixed to define outer end means of coil 35 using an associated inner end means 40 of coil 35 as a reference or base.

Reference is now made to FIGURES 5–12 wherein during the coil winding operation on an associated mandrel 52 at station 56 in the manner hereinafter described, the drive shaft 58 is momentarily stopped so that a pair of members or die blocks 85 and 86 can cold weld the leads 40 and 41 in side-by-side relation to the conductive strip 37 so that the lead 41 will form the outer lead of a core 35 being finally completed while the lead 40 will form the inner lead to be fastened on a new core 36 to be positioned at station 56 in a manner hereinafter described to define another coil 35.

Frame structure 43 has a frame means 87 for supporting two strips of lead material 90 disposed in side-by-side relation in the manner illustrated in FIGURE 12, the strips of lead material 90 being held against the frame means 87 by an upper frame means 91 cut away at 92 to permit a lead feeding mechanism 93 to operate in the manner hereinafter described.

The lead feeding structure 93 is adapted to feed the strips of lead material 90 between separated die blocks 85 and 86 to the right as seen in the drawings and from the position illustrated in FIGURE 5 to the position illustrated in FIGURE 7 whereby the lead material 90 projects beyond the strip of electrically conductive material 37 a predetermined distance to form the leads 40 and 41 when the projecting portions of the lead materials 90 are severed in the manner hereinafter described.

The lead materials 90 are respectively adapted to be fed from supply rolls thereof suitably provided along the frame structure 87 by pusher means designated by the numeral 93. Pusher 93 comprises an elongated portion 94, FIGURES 5 and 12, having a bifurcate end 95 provided with a pair of downwardly extending pushing members 96 respectively having lead engaging pointed ends 97.

The elongated portion 94 of the pusher 93 has pivot means 98 extending outwardly from opposite sides thereof and interconnected to slide means 99 that is free to be slidably moved in an associated slot 88 in frame means 91. The slide means 99 preferably has an adjustable drag (not shown) which enables the pressure of the points 97 on the lead materials 90 to be increased or decreased, as desired. In addition, an L-shaped member 100 is carried by the elongated portion 94 of the pusher 93 and member 100 can be adjustably positioned along portion 94 by a fastening means 101.

An arm 102 is carried by apparatus 42 and is adapted to be moved to the right and to the left, as seen in FIGURE 5, by suitable actuating means. Arm 102 has a yoke shaped portion 103 adapted to surround the L-shaped member 100 of pusher 93 in the manner illustrated in FIGURE 5.

Arm 102 adjustably carries an adjusting member 104 having an end 105 whereby arm 102 has spaced control surfaces 105 and 106 for respectively engaging L-shaped member 100 of the pusher 93 in a manner now to be described.

Figure 6:
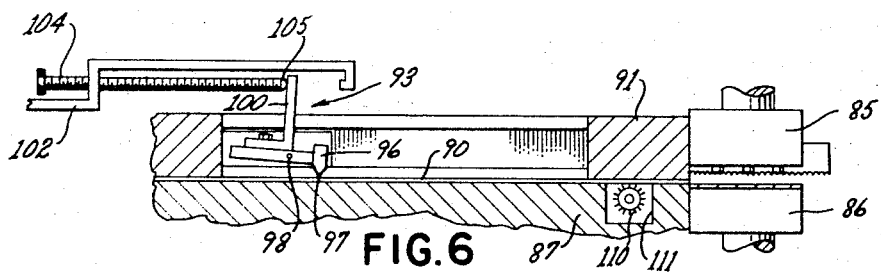

When it is desired to feed the lead material 90 outwardly between the die blocks 85 and 86 to form the leads 40 and 41, arm 102 is moved to the right from the position illustrated in FIGURE 5 until the surface 105 of adjusting member 104 engages the L-shaped member 100 and causes the pusher 93 to tend to slightly rotate in a clockwise direction about its pivot means 98 as seen in FIGURE 6 whereby each tip 97 of each pushing member 96 engages an associated strip of lead material 90. Further movement of the arm 102 from the position illustrated in FIGURE 6 to the position illustrated in FIGURE 7 causes pushing members 96 to push the strips of lead material 90 to the right in unison therewith, whereby the lead material 90 is pushed beyond the frame structures 87 and 91 and out between the die members 85 and 86 until the rightward movement of the arm 102 ceases.

Figure 7:
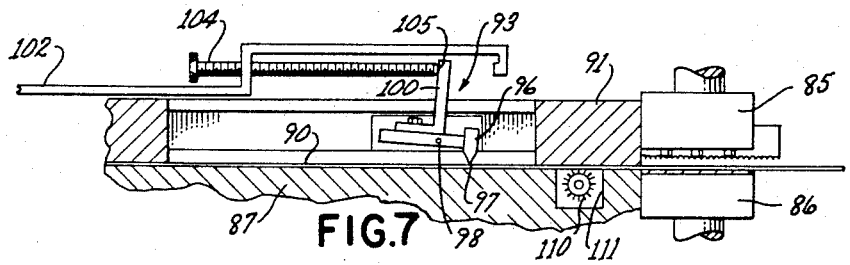

At the same time that the arm 102 moves from the position illustrated in FIGURE 5 to the position illustrated in FIGURE 7, a wire brush 110, rotatably mounted in a cutout 111 in the frame means 87 is rotated to brush the under surfaces of the lead material 90 being advanced by the pusher 93 to improve the cold welding characteristics thereof. However, as the arm 102 is moved from the position illustrated in FIGURE 7 back to the position illustrated in FIGURE 5, the rotation of wire brush 110 is preferably terminated.

As arm 102 moves back to the left, as viewed in FIGURE 5, its control surface 106 eventually engages and pushes against L-shaped member 100 of the pusher 93 to cause counterclockwise rotation thereof and raise pointed ends 97 of the pushing members 96 away from lead material 90 to assure the lead material 90 is not moved to the left during retraction of arm 102. Thus, arm 102 can return the pusher 93 back to the position illustrated in FIGURE 5 in the manner illustrated in FIGURE 10 to enable pusher 93 to advance lead material 90 in the manner previously described at a subsequent time.

Further, it can be seen that by adjusting member 104 relative to its arm 102 the desired quantity of lead material 90 pushed beyond the right hand ends of the frame members 87 and 91 can be accurately adjusted to provide leads 40 and 41 of any desired length within predetermined limits.

After the lead material 90 has been advanced to the right by the pusher 93 in the manner previously described, the die blocks 85 and 86 cooperate together to secure the lead material 90 to the strip of conductive material 37 as will be presently described.

Die block 86 has a substantially flat upper surface 114 preferably formed of metallic material and having a resilient insert 115 defining its central portion and preferably formed of a rubber like material and for a purpose to be hereinafter described. Die block 86 is carried on a shaft 120 movably mounted in a pair of fixed brackets 121 and 122 secured to the frame structure 43 of the apparatus 42.

A compression spring 123 is provided and has one end 124 supported on lower bracket 122 and its upper end 125 disposed against a shoulder 126 of the shaft 120 whereby the compression spring 123 continually urges the die block 86 upwardly to the position illustrated in FIGURE 11.

When the die block 86 is moved downwardly in the manner hereinafter described in opposition to the force of compression spring 123 its downward movement is terminated when the lower end 127 of its shaft 120 engages a stationary block 128 in the manner illustrated in FIGURE 9.

The upper die block 85 is carried by a shaft 129 which is movable upwardly and downwardly by a suitable ram means operated pneumatically, hydraulically, or mechanically, as desired. Upper die block 85 has a lower surface 130 provided with a plurality of projections 131 adapted to be disposed directly over the lead material 90 in the manner illustrated in FIGURE 11.

The upper die block 85 also carries a perforating member 132 which projects beyond its surface 130 and is located directly above the resilient member 115 of the lower die block 86 for a purpose hereinafter described.

Figure 8:
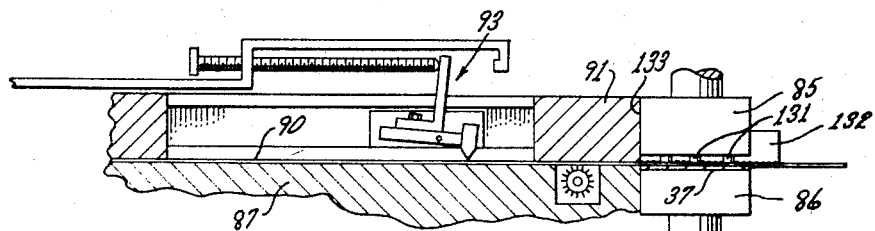

After the lead material 90 has been advanced to the right beyond the frame members 87 and 91 by the pusher 93 in the manner illustrated in FIGURE 7, the upper die block 85 is moved vertically downwardly in the manner illustrated in FIGURE 8 whereby it can be seen that the rear edge 133 of the upper die block 85 cooperates with the upper right hand corner 134 of the frame member 87 to sever lead material 90 and define leads 40 and 41 in the manner illustrated in FIGURE 9. The downward movement of the upper die block 85 during the severing operation causes the lower die block 86 to move therewith in opposition to the force of the compression spring 123.

However, when the lower die block 86 bottoms out by having end 127 of its shaft 120 abut stationary block 128 as seen in FIGURE 9, further movement of the upper die block 85 downwardly causes the projections 131 thereof to cold weld the leads 40 and 41 to the strip of conductive material 37 in the manner illustrated in FIGURE 2. Simultaneously with the cold welding of the leads 40 and 41 to the strip of conductive material 37, the perforating member 132 punches through the strip of material 37 intermediate leads 40 and 41 and is received in the resilient member 115 of the lower die member 86 whereby a perforated tear line 135, see FIGURE 2, is formed in strip 37 to render such strip severable between leads 40 and 41 for a purpose to be subsequently described.

Thus, it can be seen that the die members 85 and 86 effectively secure the electrical leads 40 and 41 to the strip of conductive material 37 after the die member 85 has severed the leads 40 and 41 from the strips of lead material 90 while at the same time die members 85 and 86 perforate the elongated strip 37 intermediate the leads 40 and 41.

Figure 13:
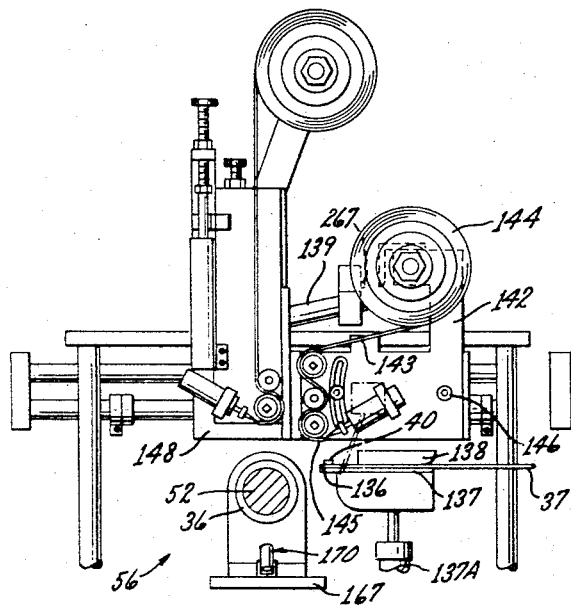
FIGURE 13 is a front view of a taping apparatus comprising the exemplary apparatus illustrated in FIGURE 3.

The forward or inner end 136 of strip 37 is normally positioned on a table means 137 of apparatus 42 in the manner illustrated in FIGURE 13 and is clamped firmly against a pressure pad 138 by an associated actuator 137A operatively connected to table 137. Inner end 136 is thus clamped during the time that a core carrying mandrel 52 is being indexed to station 56 and is being interconnected to drive shaft 58 as illustrated in FIGURE 3 by extending rod 51 radially outwardly so that core element 36 will be disposed in the position illustrated in FIGURE 13 for subsequent counterclockwise rotation thereof.

Figure 14:
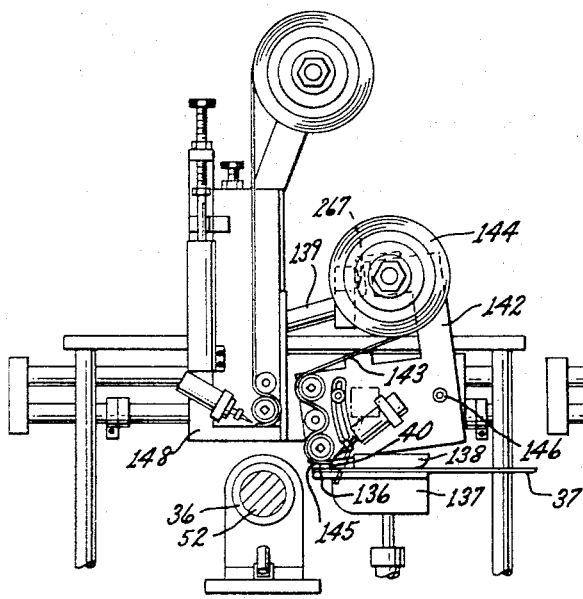

A first tape applying head 142 is adapted to draw a strip of pressure sensitive tape means 143 from a supply roll 144 thereof and have its forward end portion 145 disposed against the leading end 136 of elongated strip 37 in the manner illustrated in FIGURE 14 when the head 142 is pivoted counterclockwise about an associated pivot pin 146 by an actuating cylinder 139. The tape strip 143 has a pressure sensitive adhesive means on the side thereof which engages the end 136 of strip 37 which enables its forward end portion 145 to be firmly attached to the strip of conductive material 37.

Figure 15:
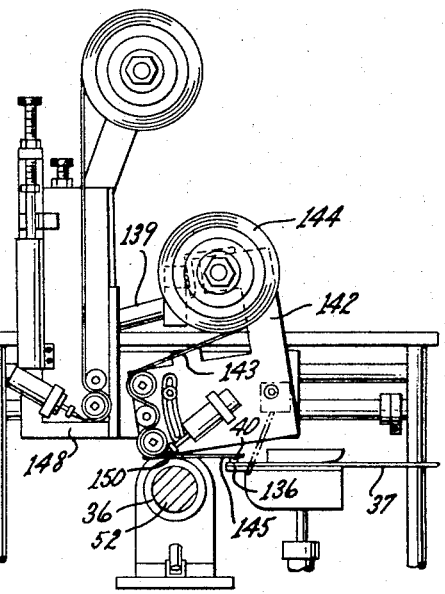
FIGURES 14–20 are views similar to FIGURE 13 illustrating the taping apparatus in various operating positions.

The taping head 142 is then moved from right to left from the position of FIGURE 14 to the position shown in FIGURE 15 causing the adhesive side of tape strip 143 to engage and be adhesively fastened to core 36. Taping head 142 is moved from right to left by moving the entire supporting frame assembly 148 which supports taping head 142 and a suitable cylinder 149 is used for this purpose.

Figure 16:
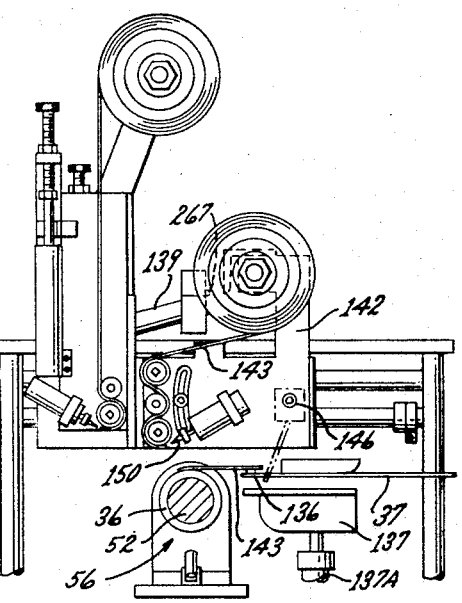

After the tape means 143 has its pressure sensitive adhesive side secured to core element 36, a suitable knife means 150 is adapted to sever the tape 143 from the head 142 in the manner illustrated in FIGURE 15 so that the taping head 142 can be pivoted upwardly by its cylinder 139 away from the core element 36 as illustrated in FIGURE 16.

In this manner, a sufficient length of the tape means 143 has been fed from the taping head 142 so that the inner end 136 of the strip of conductive material 37 is now interconnected to the core element 36 in the manner illustrated in FIGURE 16. Thus, subsequent rotation of mandrel 52 at station 56 by the drive shaft 58 causes the core element 36 to rotate in a counterclockwise direction and wind the strip of conductive material 37 onto the core element 36 to be coiled thereon in the manner illustrated in FIGURE 17, the pressure pad 138 and table 137 having been relatively separated as seen in FIGURE 4 to permit such winding operation.

Figure 21:
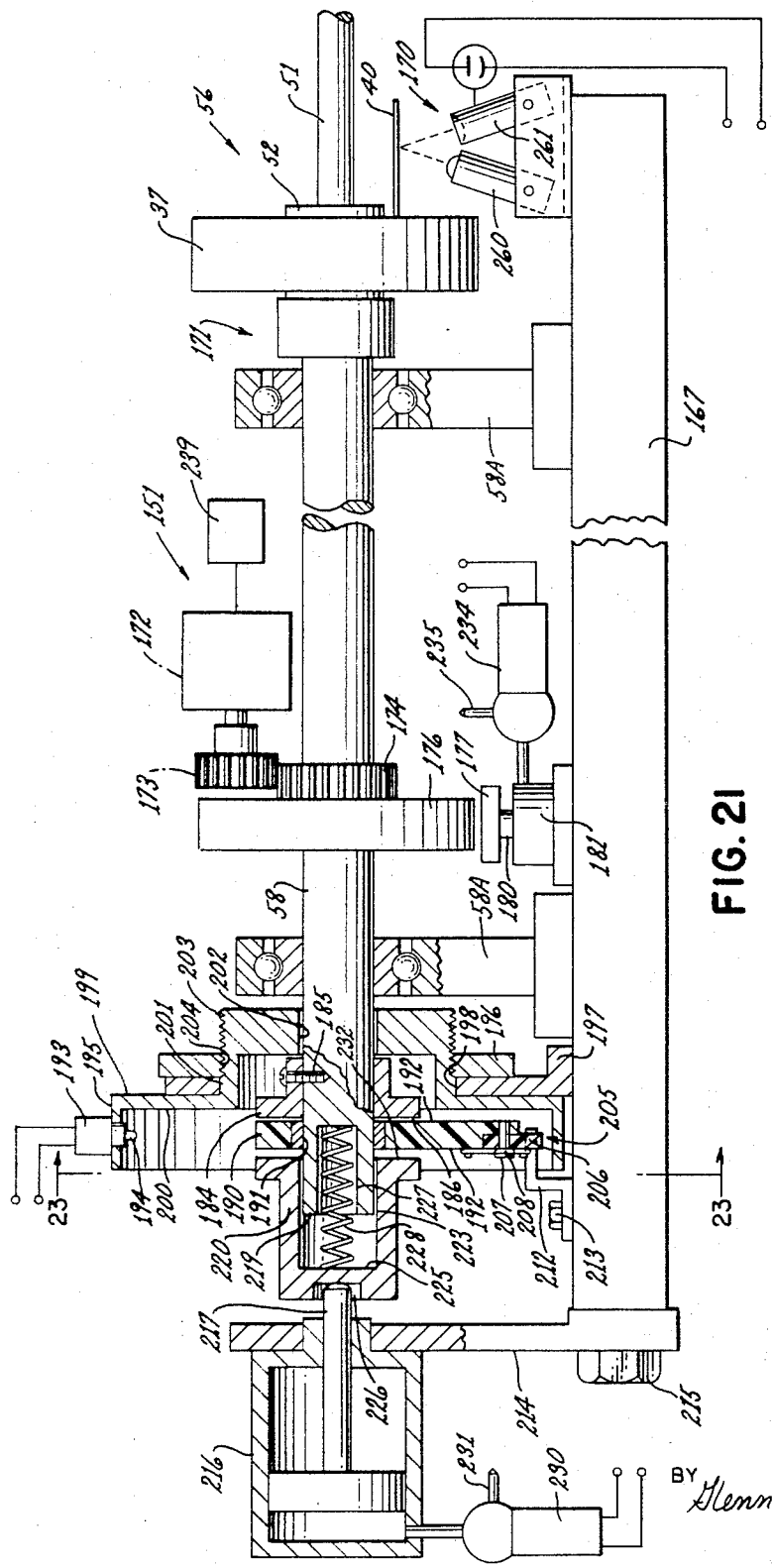
FIGURE 21 is a detailed view with parts in section and parts broken away of a device comprising the apparatus illustrated in FIGURE 3 and used to precisely position an outer lead with respect to an inner reference lead comprising a given strip conductor coil.
Figure 22:
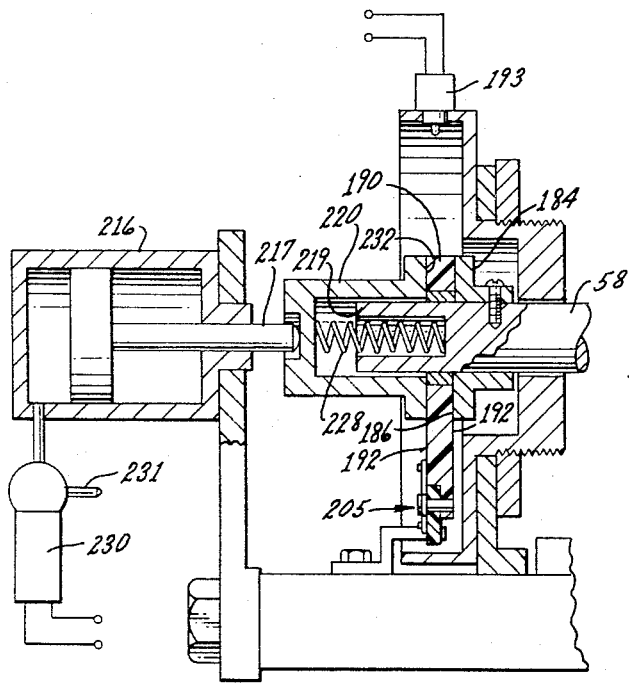
FIGURE 22 is an enlarged fragmentary view with parts in section showing the left hand portion of the device as seen in FIGURE 21.

A suitable control device designated generally by the numeral 151, see FIGURE 21, is provided for stopping apparatus 42 to enable the die means 85 and 86 to cooperate together and cold weld outer lead 41 in position based on the position of and using inner lead 40 as a reference. As previously described the cold welding by die means 85 and 86 results in the outer lead 41 of a completed coil 35 being welded in position simultaneously with an inner lead 40 of the subsequent coil 35 to be formed on apparatus 42.

Figure 17:
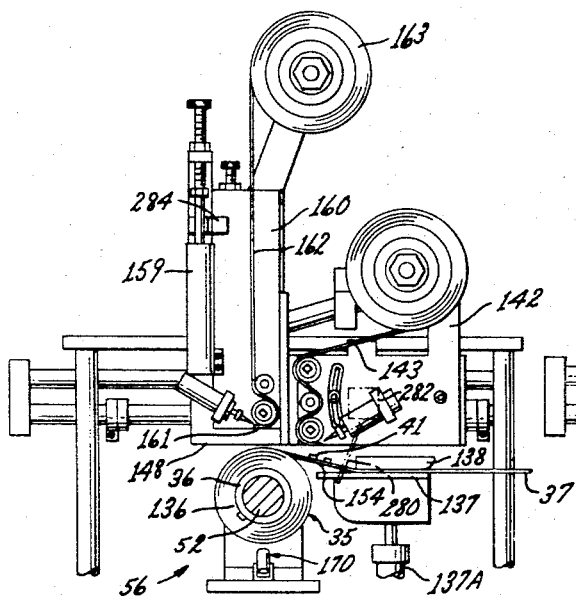

Attached leads 40 and 41 are drawn from between the cold welding die apparatus 85 and 86 to the position illustrated in FIGURE 17 whereby end portion 136 of strip 37 is sandwiched and firmly clamped between members 137 and 138 as illustrated in FIGURE 17 by actuating cylinder 137A to raise table 137. Thus, further rotation of the core element 36 in a counterclockwise direction now causes the strip of material 37 to separate along the separation line means 135 between the leads 40 and 41 so that the lead 41 and now severed end 154 of the strip 37 can be wound on the core element 36 to complete the strip conductor coil construction 35 of this invention while the leading end 136 of the strip 37 and its attached lead 40 are being held between table 137 and pressure pad 138 to be subsequently wound on another core 36 to define the inner portion of another strip conductor coil construction 35.

Prior to separation of strip 37 along perforation line 135, a second taping head 160 suitably provided on apparatus 42 is moved vertically downwardly by an actuating cylinder 159 and applies the leading end 161 of another pressure sensitive tape means 162 from a supply roll 163 thereof against the outer end of the coil construction 35. Further counterclockwise rotation of core 36 with end portion 136 firmly clamped in position causes strip 37 to sever as previously mentioned and causes the tape means 162 to be drawn thereon and completely around the coil construction 35 in the manner illustrated in FIGURES 1 and 20 to fully hold the outer coil end 154 of the strip 37 in position to prevent unwinding thereof.

Figure 20:
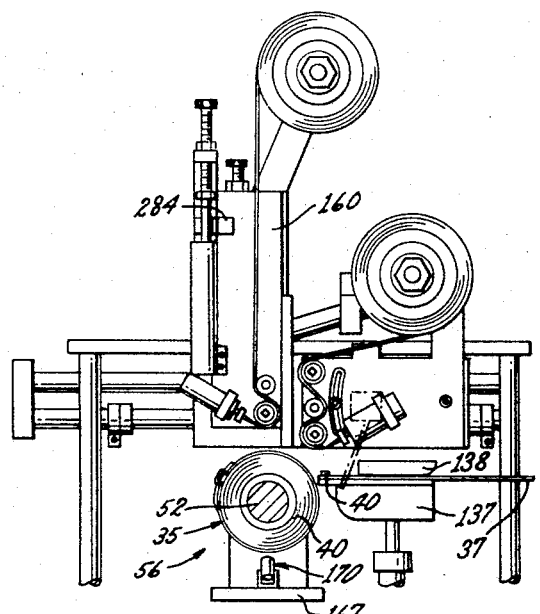

After the second tape means 162 has been applied completely around the coil construction 35 as illustrated or around a part thereof sufficient to hold the end 154 of the strip 35 to an adjacent inner coil of the strip 37, suitable knife means 165 cuts the applied tape 162 from the head 160 so that the strip conductor coil construction 35 is now completed in the manner illustrated in FIGURE 20 and can be retracted by the associated mandrel means 52 at station 56 to be subsequently indexed by the rotary table 49 to the stripping station 57 in the manner previously described.

As the completed coil construction 35 is being indexed to the station 57 to be ejected into chute 65, another mandrel 52 carrying a core element 36 is moved from station 55 to the station 56 to have another strip 37 coiled thereon in the manner previously described.

Having described the component parts of apparatus 42 in sufficient detail that the winding of elongated electrically conductive strip 37 to define coil 35 is readily understood, the description will now proceed with a detailed presentation of the apparatus and method of this invention which makes possible the precise location of the outer lead 41 on each coil 35 while using its associated inner lead 40 as a reference or base.

The overall device for precisely positioning outer lead 41 is illustrated in FIGURE 21 and designated generally by the numeral 151 as previously mentioned. Device 151 comprises a plurality of cooperating components the majority of which are supported on a suitable support 167 fixed to base structure 43 and includes sensing means such as radiant energy detecting means or photoelectric device designated generally by the numeral 170 and fixed on support 167. Device 151 also includes control means operatively connected between the photoelectric device 170 and the coil winding apparatus 42 and in particular its rotatable drive shaft means or drive shaft 58 to enable precise and positive control of coil winding apparatus 42 in a manner heretofore unknown.

A mandrel 52 is indexed to winding station 56 and extended outwardly by its associated radially telescoping rod 51 so that clutch face means provided in its terminal outer end are brought into clutching engagement with cooperating clutch face means at the terminal outer end of rotatable drive shaft 58 as illustrated generally at 171 and in a known manner. Drive shaft 58 is supported for frictionless rotation by a pair of bearing means each designated by the numeral 58A and fixed on support 167. Shaft 58 is rotated by a suitable prime mover or electric drive motor 172 comprising winding apparatus 42 and motor 172 has a driving gear 173 fixed to its output shaft which drives a cooperating driven gear 174 fixed to drive shaft 58 to enable rotation thereof and winding of elongated strip 37 to define a strip conductor coil 35.

The inner electrical lead 40 comprising each coil construction 35 is positioned with its associated inner end 136 of elongated strip 37 in a manner as previously described. As the drive shaft 58 rotates the freely rotatable mandrel 52 to wind the elongated strip 37 thereon the inner lead 40 is rotated past photoelectric device 170. The photoelectric device 170 provides rotational counting and when the predetermined desired number of revolutions have been provided on coil 35 stopping means comprising the control means for device 151 is energized to stop the drive shaft 58 in a manner as will be presently described.

The stopping means of this exemplary embodiment of the invention comprises means for precisely accurately stopping drive shaft 58 simultaneously with the shutting off of its drive motor 172 and comprises a friction wheel 176 suitably fixed to shaft 58 and adapted to be engaged by brake means shown as a friction brake 177. The friction brake 177 is carried at the terminal end of a telescoping rod 180 which is actuated by a fluid cylinder such as an air cylinder 181 at the proper time in the operating sequence in a manner as will be presently described.

As previously mentioned, one end of rotatable drive shaft 58 has suitable clutch means which enable the terminal outer end of mandrel 52 to be brought into clutching engagement therewith. One example of the type of clutch means which has been satisfactorily used is presented in detail in the above mentioned co-pending patent application Ser. No. 366,497.

The opposite end of drive shaft 58 has means provided in association therewith to enable stopping drive shaft 58 with minimum free wheeling after the drive shaft motor 172 has been shut off. It must be appreciated that this invention enables precise placement of outer lead 41 during the winding of the final layer on coil 35. Thus, precise positioning is provided within an arc not exceeding 360 degrees. In ordinary systems of this general type it is sufficient to stop the drive shaft motor and allow the system to coast down. However, such technique is inadequate for the purpose of this invention; hence, the need for more positive and precise control.

In addition, it has also been previously proposed to fix a disc on rotatable drive shaft 58 and use a photoelectric device in association therewith to provide rotational counting. However, although this technique provides adequate counting of revolutions, it is generally not known where the position of an inner lead is with respect to the position where a suitable aperture in the rotating disc energizes the photoelectric device. Therefore, such technique of using a photoelectric device with a disc fixed to the drive shaft is not adequate to enable the precise positioning of an outer lead 41 with respect to an inner lead 40.

Furthermore, it is not known from one coil to the next the precise position at which an inner lead will be adhesively fastened in position with respect to a given position on the drive shaft and hence with respect to the position of the aperture in the above mentioned disc which energizes the photoelectric device.

The improved apparatus and method of this invention however eliminates such problems since rotational counting and positioning is provided as a function of the position of the inner lead 40 irrespective of where such inner lead may be initially placed.

Drive shaft 58 has a collar 184 suitably fixed in position concentrically therearound by a threaded screw 185. Collar 184 has a substantially vertically arranged annular bearing surface means or friction surface designated generally by the numeral 186 and surface 186 is adapted to receive cam plate means carried by shaft 58 thereagainst.

The above mentioned cam means comprises rotatable cam plate 190 which is suspended adjacent collar 184. Cam plate 190 has a cylindrical opening 191 extending through its central portion and plate 190 is supported by drive shaft 58 so that such drive shaft extends through opening 191. The diameter of opening 191 is substantially larger than the outside diameter of drive shaft 58 whereby cam plate 190 is suspended on drive shaft 58 while drive shaft 58 is free to rotate during winding of each coil 35 without rotating cam plate 190. Cam plate 190 is preferably made of a lightweight resilient material and has a pair of oppositely arranged friction face means each designated by the same numeral 192.

Device 151 also has switch means shown in this example as an electrical switch 193 which has an outwardly projecting tip 194 which is adapted to be engaged by suitable switch contacting surface means to actuate switch 193. Switch 193 is suitably fixed to a bracket 195 which is adjustably fastened by a knurled ring 196 to a support 197 which is suitably fixed to base structure 167. Support 197 has an opening 198 extending therethrough.

Bracket 195 has a large diameter cylindrical outer portion designated by the numeral 199 which necks down or reduces by means of an integral annular surface 200 to a substantially smaller diameter cylindrical portion designated by the numeral 201. A central opening is provided through the reduced diameter portion 201 of bracket 195 as shown at 202 to allow drive shaft 58 to extend therethrough in an unobstructed manner.

The reduced cylindrical portion 201 of bracket 195 has a threaded outside preiphery as shown at 203 which is adapted to be extended through opening 198 of support 197.

Knurled ring 196 has a threaded opening 204 extending therethrough which is adapted to be threaded on threaded portion 203 of cylindrical portion 201. Thus, it is a simple matter to fasten bracket 195 in position by extending cylindrical portion 201 through opening 198 and then threading ring 196 thereon to sandwich surface 200 firmly between ring 196 and support 197. To change the position of switch 193 relative to support 167 or drive shaft 58 it is merely necessary to loosen ring 196, rotate bracket 195 as desired and then clamp such bracket in position by tightening ring 196.

Figure 23:
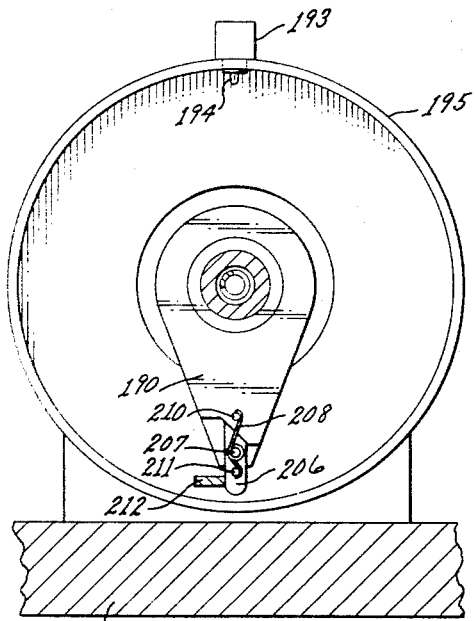
FIGURE 23 is a fragmentary sectional view on the line 23—23 of FIGURE 21 particularly showing a cam plate comprising the device of FIGURE 21 with its hinged switch engaging portion yieldingly held outwardly to engage an associated cam stop to prevent rotation of such cam plate with its supporting drive shaft means.

The rotatable cam means or cam plate 190 has releasable cam stop means shown as a stop-tripper mechanism designated generally by the numeral 205. As seen particularly in FIGURES 23–25 the tripper mechanism 205 comprises a switch contacting surface means or tip 206 which is pivoted adjacent the outer periphery of cam plate 190 about a suitable pivot pin 207. Yielding means shown as a spring 208 is provided as a portion of mechanism 205 and such spring comprises a spring clip arrangement which is supported about pin 207 and has its opposite end portions yieldingly compressed by being held against a pin 210 carried on the main body of cam plate 190 and a pin 211 fixed to switch engaging tip 206. The action of spring 208 is to normally hold tip 206 extended so that its elongated axis is arranged so that it conicides substantially with a radial line extending from the center of cam plate 190.

A suitable fixed stop 212 is fixed to structure 167 as by a threaded bolt 213 and such stop is positioned so that it is engaged by the terminal outer end portion of tip 206. During normal rotation of drive shaft 58 with cam plate 190 loosely supported therearound tip 206 engages stop 212 and rotation of cam plate with drive shaft 58 is prevnted by such stop.

Connecting means is provided for connecting the rotatable cam plate 190 with drive shaft 58 to provide simultaneous rotation and such connecting means comprises a portion of the stopping means for device 151. In this example of the invention the connecting means is operatively connected to photoelectric device or cell 170 and operates to connect cam plate 190 with drive shaft 58 once photoelectric device 170 senses a predetermined number of revolutions as inner lead 40 is rotated past photoelectric device 170.

Another bracket 214 is fastened by a bolt 215 to support 167 adjacent the terminal end of shaft 58 opposite its clutch face at 171 and designated by the numeral 219 for easy later reference thereto. Bracket 214 has actuating means illustrated as a fluid cylinder 216 fixed thereto in any suitable manner. Cylinder 216 has a telescoping rod end 217 which is adapted to engage a cylindrical sleeve 220 supported adjacent the terminal end 219 of drive shaft 58.

Sleeve 220 has a large diameter bore 223 extending therethrough which terminates in a bottom surface designated by the numeral 225. The outer portion of substantially cylindrical sleeve 220 has a blind hole designated by the numeral 226 which is adapted to receive the terminal end of rod 217. Drive shaft 58 has a cylindrical opening or bore 227 extending inwardly from its terminal end 219 and a compression spring 228 has one end thereof supported within cylindrical bore 227 and its outer end extends outwardly therefrom and is received within bore 223 of sleeve 220. The dimensional and structural arrangemnt of sleeve 220 and the position of retracted rod 217 with respect to cam plate 190 and the terminal end 219 of drive shaft 58 is such that the drive shaft 58 is free to rotate with sleeve 220 supported by spring 228 between rod 217 and the terminal end 219 of drive shaft 58 without obstructing the rotation of drive shaft 58 and without engaging or contacting cam plate 190.

The fluid cylinder 216 is preferably an air cylinder which is operated through use of a suitable electropneumatic valve 230 which is provided with a source of regulated air under pressure through a supply pipe 231. Valve 230 is electrically connected to photoelectric device 170 such that when the predetermined number of revolutions has been sensed by photoelectric device 170, valve 230 is energized porting air flow to the rear of the piston provided in cylinder 216 to thereby extend its rod end 217 outwardly.

As rod end 217 extends outwardly it overrides spring 228 and moves sleeve 220 so that its bearing surface 232 is urged into friction engagement with outer bearing surface 192 of cam plate 190 to push cam plate 190 axially inwardly along shaft 58 away from outer end 219 so that the opposite friction surface 192 of cam plate 190 engages bearing surface 186 of the flange 184 fixed to drive shaft 58. In effect, this action firmly couples the cam plate 190 with drive shaft 58 for nonslipping rotation therewith.

Figure 24:
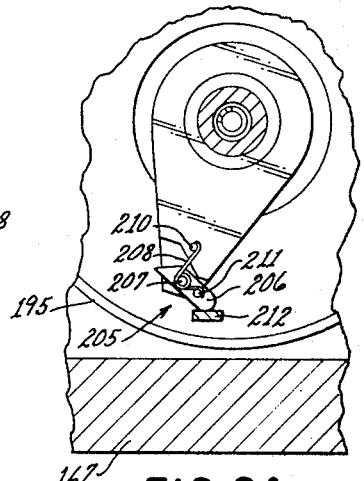
FIGURE 24 is a fragmentary view similar to FIGURE 23 showing the cam plate and its hinged switch engaging portion being rotated past its associated cam stop.
Figure 25:
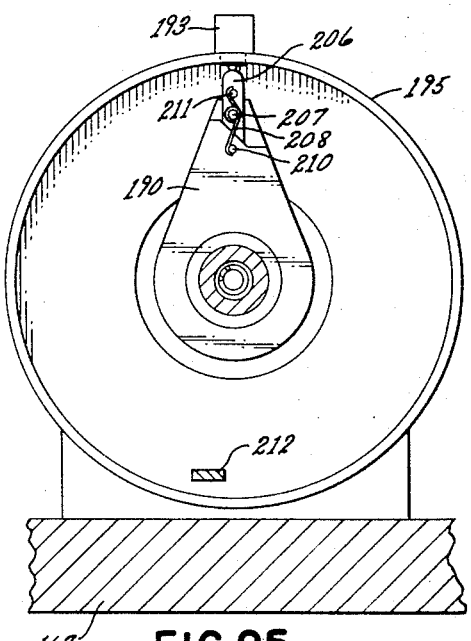
FIGURE 25 is a fragmentary view similar to FIGURE 23 showing the switch engaging portion actuating associated switch means.

With cam plate 190 coupled to drive shaft 58 the spring 208 of stop-tripper 205 is overridden by the force of drive shaft 58 to thereby rotate cam plate 190 past its stop 212 in the manner illustrated in FIGURE 24. As the drive shaft 58 continues to rotate the spring 208 returns tip 206 to its extended position and so that further clockwise rotation, as viewed in FIGURES 23–25, of drive shaft 58 causes tip 206 to engage tip 194 of switch 193 and actuate such switch.

Switch 193 is electrically connected to an electropneumatic valve 234 and to the drive motor 172 for drive shaft 58 through energizing-timing device or timer 239. Simultaneously then, as switch 193 is actuated the drive motor 172 is stopped to stop the driving force against drive shaft 58 while valve 234 actuates cylinder 181 to extend its rod portion 180 and move friction brake 177 into friction engagement with the friction wheel 176 which is fixed to drive shaft 58. It will be appreciated that valve 234 is provided with a suitable source of air under regulated pressure through a line 235.

With the drive shaft 58 stopped, a pair of leads 40 and 41 are welded in position by actuating the cold welding apparatus to provide the cold welding function between die means 85 and 86 in a manner as previously described. It will be appreciated that the outer lead 41 is precisely welded in position so that it completes the coil 35 then being wound at station 56; however, the inner lead 40 for the next coil is also simultaneously welded in position and while in actuality it too is precisely welded in position, such precise welding of lead 40 is not significant in that once the particular coil 35 being completed is removed and a new coil is wound the inner lead 40 is again used as a reference to enable precise positioning and welding of an associated outer lead 41 in position using device 151 and in the manner described above.

Once lead 41 has been cold welded in position as previously described, the friction brake 177 is released and the drive shaft 58 is jog-rotated through predetermined angular increments so that inner lead 40 may be utilized to effectively energize switch means relatively moving table 137 and bearing surface 138 together in the manner previously described. After clamping strip 37 between table 137 and combination guide and bearing surface 138 the cycle is continued to actuate the taping heads 160 and 142.

Assuming that the outer lead 41 is not in the proper position once the coil 35 has been completed it is a simple matter to loosen knurled ring 196 permitting bracket 195 to be rotated the desired angular increment and either clockwise or counterclockwise, as desired, to reposition electric switch 193. The knurled ring 196 is then tightened and another coil is run. Assuming no major variations in material thickness subsequent coils which are formed by this technique should have the lead in the desired alignment; however, if they do not, another adjustment is readily made until the precise desired relative position of leads 40 and 41 is provided.

Although in this exemplary embodiment of the invention leads 40 and 41 are arranged on each coil 35 so that they are 180 degrees apart, it will be appreciated that the outer lead 41 may be positioned at any desired angular displacement relative to inner lead 40.

Thus, it is seen that the forming of each coil 35 with precisely positioned leads 40 and 41 is accomplished utilizing the improved control device and method of this invention wherein the position of inner lead 40 is, in effect, used as a reference to control the overall winding operation.

However, it will be appreciated that elongated strip 37 may vary in thickness so that adjoining overlapping layers of each coil 35 may be of different thicknesses. With this consideration it will be appreciated that the improved device 151, even though considerably advanced over any technique heretofore proposed, may not provide perfect alignment of outer lead 41 under adverse conditions where there is substantial variation in thickness of strip 37.

Several hypothetical conditions will now be presented to emphasize that variations in dimensional thickness of strip 37 along its length may throw off the exact placement of outer lead 41 relative to inner reference lead 40. For example, if elongated strip 37 is thinner than normal, its total outside diameter when the desired number of turns has been counted by photoelectric device 170 will be comparatively small. Thus, with switch 193 set in a given position to accommodate a strip having the standard thickness a given standard length of strip 37 is defined to comprise the terminal end portion of the outer layer of coil 35 and such standard length is provided from the time photoelectric device 170 energizes cam 190 and switch 193 is actuated to stop drive shaft 58. This standard length of strip when placed on the comparatively smaller diameter coil of this hypothetical example extends over a larger arc than on a standard diameter coil. In this exemplary illustration with leads 40 and 41 placed 180 degrees apart the winding of a standard length over a slightly smaller diameter coil results in placing lead 41 at an angular position greater than 180 degrees from lead 40 as measured in the direction of winding rotation.

Conversely, assuming that the thickness of strip 37 causes a buildup of material in forming coil 35 which provides a larger diameter coil than when winding the final standard length (defined as mentioned above) on the larger diameter coil the lead 41 will be placed at an angular position smaller than 180 degrees from lead 40 as measured in the direction of winding rotation.

However, if the thickness of elongated strip 37 does not vary or if the variation is such that it balances out, for example, being too thin along one increment and too thick on the other in such a manner that it balances out and finally defines a substantially standard size outside diameter coil (both instances being highly unlikely as a practical matter); then, when photoelectric device 170 actuates cam 190 and such cam operates switch 193 the resulting travel would provide a standard length strip which when wound to comprise the last layer of coil 35 would result in lead 41 being displaced exactly 180 degrees apart from lead 40.

Figure 26:
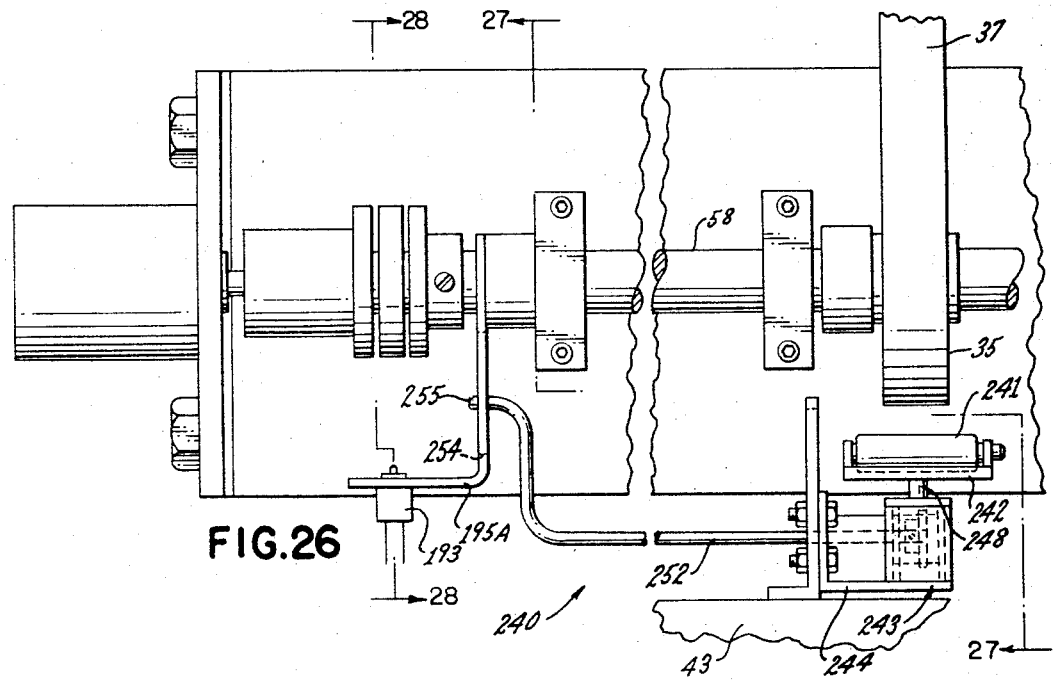
FIGURE 26 is a fragmentary view in elevation illustrating compensating means used together with the device of FIGURE 21 to define another embodiment of this invention.
Figure 27:
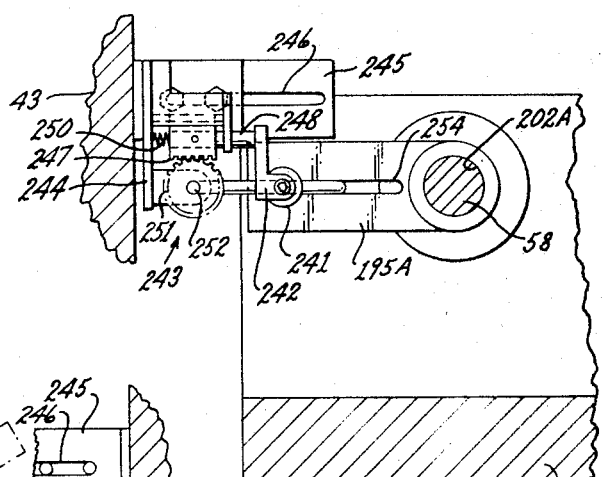
FIGURE 27 is a sectional view with parts broken away taken on the line 27—27 of FIGURE 26.
Figure 28:
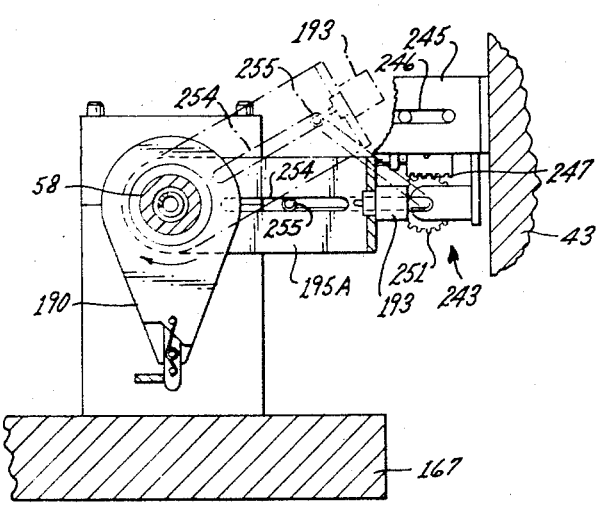
FIGURE 28 is a sectional view with parts broken away taken on the line 28—28 of FIGURE 26.

Because it is preferred to provide an essentially foolproof and substantially error-free system having means for compensating for variations in outside diameter of the final coil 35 and hence compensating for variations in thickness of elongated strip 37, compensating means is provided to be used in association with improved device 151. The compensating means of this exemplary embodiment of the invention is illustrated in FIGURES 26–28 and designated generally by the numeral 240.

Compensating means 240 of this embodiment of the invention is illustrated being used in a cooperating manner with control device 151, therefore, corresponding parts of device 151 will be designated by the same numeral as previously and not described again. Basically, compensating device 240 has means for automatically compensating for variations in the outside diameter of coil 35 and adjusting the position of siwtch 193 in a corresponding manner.

The support bracket which supports switch 193 will be designated generally by the numeral 195A to correspond to the support bracket 195 previously described and bracket 195A has an opening 202A allowing drive shaft 58 to extend through opening 202A in a freely rotatable manner. Also, it will be appreciated that support 197 and its knurled ring 196 together with bracket 195 comprising device 151 are not required as part of the control device 151 used with automatic compensating mechanism 240.

The compensating mechanism 240 comprises roller means shown as a freely rotatable roller 241 mhich is carried in a suitable yoke-like support 242 which extends upwardly from a mechanical assembly 243. Mechanical assembly 243 is supported on a substantially L-shaped flange 244 which is in turn fastened on L-shaped bracket 245 which is in turn fixed to structure 43. Bracket 245 has an elongated slot 246 provided therein which enables mechanical assembly 243 and its supporting bracket to be adjustably positioned with respect to structure 43 and hence be adjustably positioned essentially radially toward and away from coil 35 as such coil is being wound on mandrel 52. This adjustment feature may be used to provide manual adjustability to help take care of lags in the operation of the various components of apparatus 42 and supplements the automatic action of the compensating device 240.

Yoke-like support 242 has a rod 248 fixed thereto and a rack 247 is provided and suitably fixed at the lower end portion of rod 248. Spring means shown as a compression of spring 250 is provided so that it engages one end of rack 247 and acts against a cooperating surface of L-shaped bracket 244 to urge the rack 247 away from bracket 244 and hence urge rod 248, yoke 242, and its freely rotatable roller 241 into yielding engagement against the outside periphery of the coil 35 as it is being formed.

Bracket 244 also suitably carries a pinion gear 251 suitably fixed on an elongated substantially L-shaped shaft 252 which is mounted for free pivoting movement on a suitable support provided on bracket 244. The construction and arrangement of mechanical assembly 243 is such that rack 247 engages and rotates pinion 251 in a known manner and is a function of the outside diameter of a given coil 35 being formed by apparatus 42. Thus, a rack 247 is moved in response to the outside diameter of coil 35 it rotates pinion 251 and its L-shaped shaft 252 in one direction or the other.

As previously mentioned, switch support bracket 195A is supported on drive shaft 58 so that drive shaft 58 is free to rotate therethrough. Bracket 195A has an elongated slot shown at 254 extending therethrough and adapted to receive a curved (also L-shaped) terminal end portion 255 of elongated roughly L-shaped arm or shaft 252. It will be appreciated that rod end 255 will be moved as the diameter of coil 35 changes to correspondingly move bracket 195A and hence reposition switch 193 about shaft 58. FIGURE 28 of the drawings illustrates, by way of example, the positioning of bracket 195A by rod end portion 255 from a solid line to a dotted line position.

Thus, as coil 35 reaches its last turn it will be seen that roller 241 is moved to move yoke 242 and rod 248 so as to actuate the linkage 243 and position shaft 252 so that bracket 195A is moved an amount determined by the diameter of coil 35. In this manner, it is seen that not only is the winding apparatus 42 controlled in a precise manner by device 151 is a function of the position of inner lead 40 but in this latter embodiment of the invention illustrated in FIGURES 26–29 the compensating means 240 cooperates with device 151 to provide a substantially foolproof perfect arrangement which enables precise positioning of the outer lead 41 with respect to inner lead 40 irrespective of the dimensional variations that may occur in the thickness of elongated strip 37.

The preferred photoelectric device 170 provided by this invention is preferably a device having a light emitting source 260 and a light collecting or receiving means designated by the numeral 261. The light is emitted by source 260 and as the inner lead 40 interrupts the emitted light a beam of such light is reflected by the inner lead 40 toward the light receiving means 261 so as to provide the rotational counting and a precise reference position in the manner previously described.

It will be appreciated that in this arrangement the lead 40 is constructed and arranged so that the portion thereof which extends outwardly of coil 35 has a substantially planar portion and is made of a material having light reflective characteristics.

However, while the illustrated device 151 shows a photoelectric device 170 which utilizes a reflective technique it will be appreciated that photoelectric device 171 may be of the type which does not utilize reflected light but utilizes a beam which is directed directly from an emitting source to a receiving source and rotational counting is provided by interruption of such beam by lead 40.

Having described the detailed components of the improved winding apparatus 42 of this invention and in particular having described the apparatus and method of this invention provided for precisely controlling the coil winding apparatus 42, a general description of the operation of the overall machine 42 will now be presented.

The general operation of winding apparatus 42 will now be described referring first to FIGURE 20 of the drawings. Furthermore, certain switch means will be introduced in connection with this description of the general operation to facilitate a better understanding of the operation of machine 42. It will be seen from FIGURE 20 that a completed coil 35 is supported on its associated mandrel 52 at station 56 and that table 137 is held against its cooperating bearing surface and guide means 138 with elongated strip 37 and its inner lead 40 clamped between table 137 and guide 138 and firmly held in the manner illustrated.

The rotary indexing table 49 is then indexed moving completed coil 35 from winding station 56 to stripping station 57 while simultaneously moving another mandrel 52 with another core 36 to station 56 and a stripped mandrel 52 is moved opposite station 55. As the piston rods 51 carrying each mandrel 52 to move to their respective stations, portions 51A of rods 51 trip suitable switch means each designated by the numeral 265 and supported on structure 43 immediately beneath indexing table 49 and opposite stations 55, 56, and 57, see FIGURE 3.

The tripped switches 265 energize suitable valve means provided with each cylinder 50 causing such cylinders to extend their rod ends 51 and associated mandrels 52 outwardly. This action causes face clutch means on mandrel 52 at station 56 to engage cooperating clutch means on drive shaft 58 as shown at 171 (FIGURE 21) so that subsequent rotation of drive shaft 58 will rotate the freely rotatable core carrying mandrel 52 at station 56. Simultaneously, the mandrel 52 at station 55 is extended into core retainer 48 to receive a core 36 thereon, and the third mandrel 52 at station 57 is extended into position to allow its coil 35 to be gripped by the gripping members 61 in the manner previously described.

As mandrel 52 is extended into retainer 48 at station 55, it trips a switch (not shown) which in turn actuates cylinder 139 to pivot the taping head 142 about its pivot 146 from the position illustrated in FIGURE 13 to the position illustrated in FIGURE 14 to apply the end 145 of the tape 143 to the inner lead 40 supported with its associated end of strip 37 on table 137.

Pivotal movement of the taping head 142 from the position illustrated in FIGURE 13 to the position illustrated in FIGURE 14 causes the taping head 142 to actuate a switch 267, FIGURE 13, which actuates a cylinder 149 to move the entire frame 148 (supporting taping head 142) from the position illustrated in FIGURE 14 to the position illustrated in FIGURE 15 whereby the tape 143 extends from the lead 40 onto the core 36. When the frame means 148 moves to the position illustrated in FIGURE 15, a plunger 272 engages a switch 273, see FIGURE 30, which causes the actuator 137A provided to move table 137 up and down to lower table 137 to the position illustrated in FIGURE 16.

The switch 273 also actuates the main drive motor 172 (FIGURE 21) of the apparatus 42 to start rotating drive shaft 58. However, simultaneously a plunger 274 operates a switch 275 which actuates the cutting knife 150 to cut the tape 143 in the manner illustrated in FIGURE 15. The switch 275 also actuates the cylinder 64 to cause the gripping members 61 to grip the coil 35 at the station 57.

The switch 273 also actuates the cylinder 139 to pivot the taping head means 142 from the position illustrated in FIGURE 15 to the position illustrated in FIGURE 16 whereby the movement of the taping head means 142 releases the switch 267 to cause the cylinder 149 to return the frame means 148 back to the position illustrated in FIGURE 17.

With the main drive motor 172 now operating, the drive shaft 58 rotates the core carrying mandrel 36 at station 56 to cause the strip of material 37 to be wound thereon. As elongated strip 37 is wound on core 36 the control device 151 operates to stop the winding operation once the proper number of turns have been provided on strip conductor coil 35.

The control device employs photoelectric device 170 which senses the position of inner electrical lead 40 while providing rotational counting. In effect, photoelectric device uses the position of inner lead 40 as a base reference to stop drive shaft 58 in a positive manner using brake 177, as previously described, to enable cold welding of outer lead 41 in a precise position relative to inner lead 40.

In addition, in the embodiment of this invention presented in FIGURES 26–29 compensating means is also provided for cooperation with the unique device 151 to compensate for variations in the thickness of a given elongated strip 37 comprising a given completed coil as previously described in detail.

Brake 177 comprising device 151 is controlled by switch 193 which also comprises a part of device 151. As switch 193 is energized it also starts timer 240 (FIGURE 21 which is operatively connected to die blocks 85 and 86 setting such die blocks in motion to cold weld an outer lead 41 in position for the completed coil 35 as well as simultaneously cold weld an inner lead 40 adjacent thereto for the coil 35 to be subsequently wound.

After the leads 40 and 41 have been cold welded to the strip of conductive material 37 in the manner previously described, the timer 239 jog rotates drive shaft 58 to place the leads between the guide means 138 and lowered table 137 until the lead 41 goes by a switch arm 280 (FIGURE 17) which actuates a switch 282. Switch 282 actuates the cylinder 137A raising table 137 to compress the strip material 37 between the table 137 and guide means 138. The timer 239 continues to control jog rotation of shaft 58 which causes the strip material 37 to break at the serration line 135.

Figure 18:
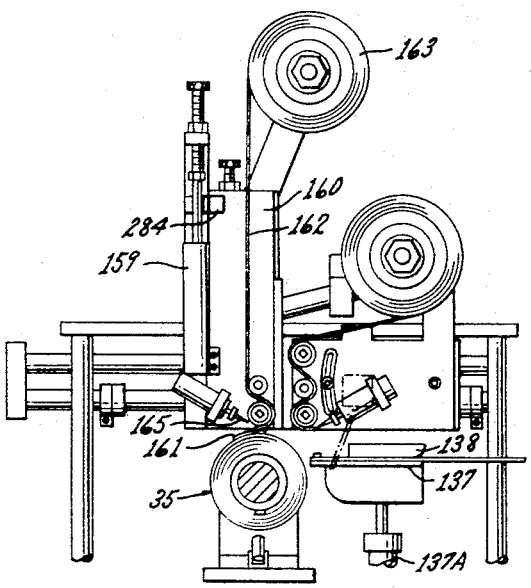

However, immediately preceding the clamping of strip material between table 137 and guide 138 the timer 239 actuates a cylinder 159 to move the taping head means 160 downwardly from the position illustrated in FIGURE 17 to the position illustrated in FIGURE 18 to apply the end 161 of the tape 162 against the outer layer of coil 35. As the coil 35 continues to rotate by rotating shaft 58 after breaking along serration line 135 the pressure sensitive adhesive tape 162 is wrapped thereon for the desired amount until the timer causes the cylinder 159 to raise the taping head means 160 while operating the knife means 165 to sever the tape in the manner illustarted in FIGURE 19.

Figure 19:
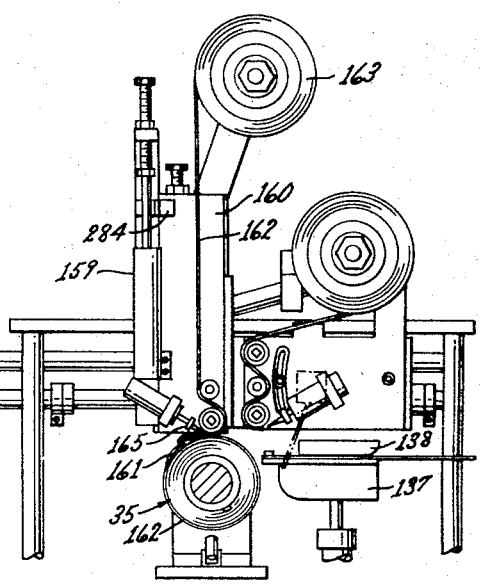

As the taping head means 160 moves upwardly from the position illustrated in FIGURE 19 to the position illustarted in FIGURE 20, the same trips a one way switch 284, FIGURE 17, which actuates the cylinders 50 on the indexing table 49 to retract their associated piston rods 51. As the piston rods 51 carry the mandrels 52 inwardly toward the table 49, the portions 51A on piston rods 51 trip the switches 265 which cause the actuaor 64 to move the stripping members 61 outwardly so that the coil 35 being held thereby will drop onto the chute 65.

Simultaneously, the tripped switches 265 cause the table 49 to rotate and as table 49 rotates, the portion 51A of the piston rod 51 moving betwen the stations 55 and 56 actuates switch 286 which reactivates the switches 265 so that when switches 265 are again actuated by the portions 51A of the piston rod 51 being received at their respective stations, theswitches 265 will cause the cylinder 50 to extend such piston rods 51.

However, before the table 49 will rotate to reposition the mandrels 52 in the manner previously described, a suitable photo reflective eye arrangement must first sense that a core 36 is on the mandrel 52 at the station 55 and that the table 137 is in its up position.

Therefore, it can be seen that the apparatus 42 of this invention is now in a new position to begin winding another strip conductive coil 35 in the manner previously described.

The apparatus 42 of this exemplary embodiment of the invention has been described as winding strip conductor coil 35 comprised of a single strip 37 having suitable electrical insulation provided thereon, it is to be understood that the strip conductor coils 35 could be wound with an interleaved strip of insulation if desired, and as taught in the above mentioned co-pending patent applications.

Thus, it is seen that apparatus 42 and its unique control device 151 with or without compensating device 240 enables the provision of wound coils 35 having leads 40 and 41 which are precisely positioned relative to each other in a manner which is greatly improved over prior teachniques.

Terms such as "inner," "outer," "outwardly," "inwardly," "downwardly," "upwardly," and the like, have been used in this disclosure for ease of description and to correspond to the arrangement of components as presented in the drawings and such terms should not be considered as limiting the scope of this invention in any way.

Therefore, it will be seen that this invention provides an improved apparatus for and method of continuously making strip conductor coils, or the like.

While the form of the invention now preferred has been disclosed as required by statute, other forms may be used, all coming within the scope of the claimed subject matter which follows.

What is claimed is:

1. A device for precisely controlling a coil winding apparatus having rotatable drive shaft means during winding of material means with said drive shaft means to form coil means, said device comprising, sensing means for sensing movement of a protruding extension of inner end means of material means defining said coil means, and control means operatively connected between said sensing means and said winding apparatus to enable precise control of said winding apparatus using the position of said inner end means as a reference position.

2. A device as set forth in claim 1 in which said control means comprises stopping means for stopping said winding apparatus to enable severing of said material means to define outer end means for said coil means located at a precise position relative to said inner end means.

3. A device as set forth in claim 1 for controlling the winding of material means made of an electrically conductive material in which, said inner end means comprises an inner electrical lead fixed adjacent the inner terminal end of said electrically conductive material defining said coil means, and said sensing means senses movement of said inner electrical lead to thereby effectively use the position of said inner electrical lead to define said reference position.

4. A device as set forth in claim 3 in which said control means comprises stopping means for stopping said winding apparatus to enable an outer electrical lead comprising said outer end means to be fixed to said electrically conductive material at a precise position relative to the position of said inner electrical lead.

5. A device as set forth in claim 4 in which said sensing means comprises radiant energy detecting means for sensing rotary movement of said inner electrical lead and said radiant energy detecting means provides rotational counting.

6. A device as set forth in claim 4 in which said stopping means comprises, brake means for stopping said drive shaft means, switch means for energizing said brake means, rotatable cam means having switch contacting surface means adapted to actuate said switch means, and connecting means for connecting said rotatable cam means with said drive shaft means to enable rotation of said cam means therewith and actuation of said switch means, said connecting means being energized by said sensing means after said sensing means senses rotary movement of said inner electrical lead past said sensing means a predetermined number of revolutions and as the last one of said revolutions is sensed by said sensing means the exact position of said inner lead is known to define said reference position and enable energizing said connecting means to stop said drive shaft means and enable said outer electrical lead to be fixed in said precise position.

7. A device as set forth in claim 6 further comprising adjusting means for adjusting the position of said switch means to thereby control the amount said cam means must rotate to engage said switch means and hence control the peripheral position of said outer electrical lead relative to said inner electrical lead.

8. A device as set forth in claim 6 further comprising compensating means for compensating for deviations of said coil means from a desired diameter to thereby further control the peripheral position of said outer electrical lead in a more accurate manner.

9. A device as set forth in claim 6 in which said sensing means comprises photoelectric means and said device further comprises compensating means provided to compensate for deviations in the thickness of said strip conductor, said compensating means comprising, adjustably positioned bracket means supporting said switch means, means responsive to the outside diameter of said coil means, and linkage means operatively connected between said means responsive to the outside diameterof said coil means and said bracket means to thereby automatically adjust the position of said switch means and control the peripheral position of said outer electrical lead irrespective of dimensional variations in the thickness of said strip conductor.

10. A device as set forth in claim 7 in which said sensing means comprises photoelectric means, said brake means comprises friction brake means, said cam plate means comprises a cam plate having oppositely arranged clutch face means and central opening means enabling said cam plate means to be supported adjacent one end of said drive shaft means with said drive shaft means extending therethrough for rotation in an unobstructed manner and said cam plate means further comprises releasable stop means adapted to prevent rotation of said cam plate during normal rotation of said drive shaft means, and said connecting means is adapted to axially urge said cam plate means so that its oppositely arranged clutch face means engage cooperating surface means fixed on said drive shaft means and said connecting means, whereby upon actuating said connecting means said cam plate means and its releasable stop means is also carried with said drive shaft means to enable actuation of said switch means.

11. In combination: a strip conductor coil winding apparatus and a device for precisely controlling said winding apparatus during winding of an electrical strip conductor to form coil means, said device comprising, sensing means for sensing movement of a protruding extension of inner end means of a strip conductor defining said coil means, and control means operatively connected between said sensing means and said winding apparatus to enable precise control of said winding apparatus using the position of said inner end means as a reference position.

12. The combination as set forth in claim 11 in which said control means comprises stopping means for stopping said winding apparatus to enable precise severing of said strip conductor to define outer end means for said coil means.

13. The combination as set forth in claim 11 in which, said inner end means comprises an inner electrical lead fixed adjacent the inner terminal end of said strip conductor defining said coil means, and said sensing means senses rotation of said inner electrical lead past a fixed location to thereby effectively use the position of said inner electrical lead to define said reference position.

14. The combination as set forth in claim 13 in which said control means comprises stopping means for stopping said winding apparatus to enable an outer electrical lead comprising said outer end means to be fixed to said strip conductor at a precise position relative to the position of said inner electrical lead.

15. The combination as set forth in claim 14 in which said inner electrical lead comprises a substantially planar portion extending outwardly of the main body of said coil means and made of a light reflective material and said sensing means comprises photoelectric means having a light emitting source ararnged to emit light generally toward said planar portion during rotation thereof and means for receiving a reflected beam of said emitted light to provide rotational counting.

16. The combination as set forth in claim 14 in which said winding apparatus comprises rotatable drive shaft means for winding said strip conductor and said stopping means comprises, brake means for stopping said drive shaft means, switch means for energizing said brake means, rotatable cam means having switch contacting surface means adapted to actuate said switch means, and connecting means for connecting said rotatable cam means with said drive shaft means to enable rotation of said cam means therewith and actuation of said switch means, said connecting means being energized by said sensing means after said sensing means senses rotation of said inner electrical lead past said sensing means a predetermined number of revolutions and as the last one of said revolutions is sensed by said sensing means the exact position of said inner lead is known to define said reference position and enable energizing said connecting means to stop said drive shaft means and enable said outer electrical lead to be fixed in said precise position.

17. The combination as set forth in claim 16 further comprising adjusting means for adjusting the position of said switch means to thereby control the amount said cam means must rotate to engage said switch means and hence control the peripheral position of said outer electrical lead relative to said inner eelctrical lead.

18. The combination as set forth in claim 16 further comprising compensating means for compensating for deviations in the thickness of said strip conductor to thereby further control the peripheral position of said outer electrical lead in a more accurate manner.

19. The combination as set forth in claim 16 in which said sensing means comprises photoelectric means and said device further comprises compensating means provided to compensate for deviations in the thickness of said strip conductor, said compensating means comprising, adjustably positioned bracket means supportnig said switch means, means responsive to the outside diameter of said coil means, and linkage means operatively connected between said means responsive to the outside diameter of said coil means and said bracket means to thereby automatically adjust the position of said switch means and control the peripheral position of said outer electrical lead irrespective of dimensional variations in the thickness of said strip conductor.

20. The combination as set forth in claim 19 in which said means responsive to the outside diameter of said coil means comprises mechanical means engaging said coil means and providing a mechanical output motion, said linkage means comprises mechanical linkage means, and said combination further comprising manual setting means for initially manually adjusting the position of said compensating means and hence the nominal effective position of said switch means to thereby compensate for any inherent lag in the operation of cooperating components of said strip coil winding apparatus.

21. The combination as set forth in claim 17 in which, said sensing means comprises photoelectric means, said brake means comprises friction brake means, said cam plate means comprises a cam plate having oppositely arranged clutch face means and central opening means enabling said cam plate means to be supported adjacent one end of said drive shaft means with said drive shaft means extending therethrough for rotation in an unobstructed manner and said cam plate means further comprises releasable stop means adapted to prevent rotation of said cam plate during normal rotation of said drive shaft means, and said connecting means is adapted to axially urge said cam plate so that its oppositely arranged clutch face means engage cooperating surface means fixed on said drive shaft means and said connecting means, whereby upon actuating said connecting means said cam plate means and its releasable stop means is also carried with said drive shaft means to enable actuation of said switch means.

22. A method of precisely winding coil means of material means comprising the steps of, providing a coil winding apparatus having rotatable drive shaft means, providing material means adapted to be wound by said drive shaft means of said winding apparatus, providing protruding means on inner end means of said material means, winding said material means with said drive shaft means to form coil means, providing sensing means, sensing movement of said protruding means of said inner end means of material means defining said coil means with said sensing means, providing control means, and operatively connecting said control means between said sensing means and said winding apparatus, whereby said winding apparatus is precisely controlled using the position of said inner end means as a reference position.

23. A method as set forth in claim 22 in which said step of providing control means comprises the step of providing stopping means and said method comprises the further step of stopping said winding apparatus with said stopping means to enable severing of said material means to define outer end means for said coil means located at a precise position relative to said inner end means.

24. A method as set forth in claim 22 in which said step of providing material means comprises providing material means made of an electrically conductive material and said method comprises the further steps of providing an inner electrical lead and fixing said inner electrical lead to said electrically conductive material to define said inner end means, whereby said sensing step comprises sensing movement of said inner electrical lead to thereby effectively use the position of said inner electrical lead as a reference position.

25. A method as set forth in claim 24 in which said step of providing control means comprises the step of providing stopping means and said method comprises the further steps of, stopping said winding apparatus with said stopping means, providing an outer electrical lead, and fixing said outer electrical lead to said electrically conductive material at a precise position relative to said inner electrical lead to thereby define said outer end means.

26. A method as set forth in claim 25 in which said step of providing sensing means comprises providing radiant energy detecting means and said sensing step comprises sensing rotary movement of said inner electrical lead to enable said radiant energy detecting means to provide rotational counting during said sensing step.

27. A method as set forth in claim 25 in which said step of providing stopping means comprises the further steps of, providing brake means for stopping said drive shaft means, providing switch means operatively connected to said brake means for energizing said brake means, providing rotatable cam means having switch contacting surface means adapted to actuate said switch means, providing connecting means for connecting said rotatable cam means with said drive shaft means to enable rotation of said cam means therewith and actuation of said switch means, and energizing said connecting means with said sensing means after said sensing means senses rotary movement of said inner electrical lead past said sensing means a predetermined number of revoluions and as the last one of said revolutions is sensed by said sensing means the exact position of said inner electrical lead is known to define said reference position, whereby upon energizing said connecting means said cam means is connected to said drive shaft means to actuate said switch means and hence said brake means to stop said drive shaft means and enable said outer electrical lead to be fixed in said precise position.

28. A method as set forth in claim 27 comprising the further steps of providing adjusting means and adjusting the position of said switch means with said adjusting means to thereby adjust the amount said cam means must rotate to engage said switch means and hence accurately adjust the peripheral position of said outer electrical lead relative to said inner electrical lead.

29. A method as set forth in claim 27 comprising the further steps of providing compensating means and compensating for deviations of said coil means from a desired standard diameter with said compensating means to control more accurately the peripheral position at which said outer electrical lead is fixed on said electrically conductive material.

30. A method of precisely winding strip conductor coil means comprising the steps of, providing a winding apparatus, providing an electrical strip conductor, providing protruding means on inner end means of said conductor, winding said strip conductor with said winding apparatus to form coil means, providing sensing means, sensing movement of said protruding means of said inner end means of a strip conductor defining said coil means with said sensing means, providing control means, and operatively connecting said control means between said sensing means and said winding apparatus, whereby said winding apparatus is precisely controlled using the position of said inner end means as a reference position.

31. A method as set forth in claim 30 in which said step of providing control means comprises the step of providing stopping means and said method comprising the further step of stopping said winding apparatus with said stopping means to enable precise severing of said strip conductor to define outer end means for said coil means located at a precise position relative to said inner end means.

32. A method as set forth in claim 30 comprising the further steps of providing an inner electrical lead and fixing said inner electrical lead to said strip conductor to define said inner end means, whereby said sensing step comprises sensing rotation of said inner electrical lead past a fixed location to thereby effectively use the position of said inner electrical lead to define said reference position.

33. A method as set forth in claim 32 in which said step of providing control means comprises the step of providing stopping means and said method comprises the further steps of, stopping said winding apparatus with said stopping means, providing an outer electrical lead, and fixing said outer electrical lead to said strip conductor at a precise position relative to the position of said inner electrical lead to thereby define said outer end means.

34. A method as set forth in claim 33 in which said step of providing an inner electrical lead comprises providing said inner electrical lead made of a light reflective material and having a substantially planar portion, said step of fixing said inner electrical lead to said strip conductor comprises fixing said inner electrical lead with its planar portion extending outwardly of the main body of said coil means, and said step of providing sensing means comprises providing photoelectric means, said photoelectric means having a light emitting source arranged to emit light generally toward said planar portion during rotation thereof and receive a reflected beam of said emitted light from said planar portion to provide rotational counting during said sensing step.

35. A method as set forth in claim 33 in which, said step of providing a winding apparatus comprises providing a winding apparatus having rotatable drive shaft means and said step of providing stopping means comprises the further steps of, providing brake means for stopping said drive shaft means, providing switch means operatively connected to said brake means for energizing said brake means, providing rotatable cam means having switch contacting surface means adapted to actuate said switch means, providing connecting means for connecting said rotatable cam means with said drive shaft means to enable rotation of said cam means therewith and actuation of said switch means, and energizing said connecting means with said sensing means after said sensing means senses rotation of said inner electrical lead past said sensing means a predetermined number of revolutions and as the last one of said revolutions is sensed by said sensing means the exact position of said inner electrical lead is known to define said reference position, whereby upon energizing said connecting means said cam means is connected with said drive shaft means to actuate said switch means and hence said brake means to stop said drive shaft means and enable said outer electrical lead to be fixed in said precise position.

36. A method as set forth in claim 35 comprising the further steps of providing adjusting means and adjusting the position of said switch means with said adjusting means to thereby control the amount said cam means must rotate to engage said switch means and hence control the peripheral position of said outer electrical lead relative to said inner electrical lead.

37. A method as set forth in claim 35 comprising the further steps of, providing compensating means, compensating for deviations in the thickness of said strip conductor with said compensating means to thereby more accurately control the peripheral position at which said outer electrical lead is fixed to said strip conductor, providing setting means for manually setting the initial effective position of said compensating means and hence the effective position of said switch means, and setting said compensating means with said setting means to thereby initially manually adjust the position of said switch means to compensate for inherent lag in the operation of cooperating components of said strip coil winding apparatus.

38. A method as set forth in claim 35 in which said step of providing brake means comprises the steps of providing friction wheel means fixed to said drive shaft means providing fluid cylinder actuated friction surface means, and actuating said friction surface means against said friction wheel means to stop said drive shaft means.

39. A method as set forth in claim 38 in which said step of providing an inner electrical lead comprises providing said inner electrical lead made of a light reflective material and having a substantially planar portion, said step of fixing said inner electrical lead to said strip conductor comprises fixing said inner electrical lead with its planar portion extending outwardly of the main body of said coil means, and said step of providing sensing means comprises providing photoelectric means, said photoelectric means having a light emitting source arranged to emit light generally toward said planar portion during rotation thereof and receive a reflected beam of said emitted light from said planar portion to sense said rotation during said sensing step.

40. A method as set forth in claim 35 comprising the further step of providing bearing surface means fixed on said drive shaft means and said step of providing connecting means comprises providing fluid cylinder actuating means adapted to urge and hold said cam means against said bearing surface means to provide said connecting of said cam means with said drive shaft means.

References Cited
UNITED STATES PATENTS

| | | | |
|---|---|---|---|
| 2,333,966 | 11/1943 | Weiss | 29—25.42 |
| 3,234,628 | 2/1966 | Frekko | 29—25.42 |
| 3,278,130 | 10/1966 | Jannett | 29—25.41 X |

JOHN F. CAMPBELL, *Primary Examiner.*

C. E. HALL, *Assistant Examiner.*

U.S. Cl. X.R.

29—203, 25.42; 242—56.1, 9; 140—92.1